Patented June 22, 1926.

1,589,519

UNITED STATES PATENT OFFICE.

CLINTON E. DOLBEAR, OF PASADENA, CALIFORNIA.

SEPARATION OF SODIUM CHLORIDE FROM MIXED SALTS.

No Drawing. Application filed April 25, 1925. Serial No. 25,942.

This invention and discovery relates to an improvement in effecting the separation of sodium chloride from solar salts produced from brines similar in character to the potash-bearing brines of Searles Lake, California.

The object of this invention is to primarily separate the sodium chloride from the other contained salts before attempting to separate the other salts from each other.

The solar salt from Searles Lake brine contains over 50% of its weight of sodium chloride. The other contained salts are chiefly glaserite (the double salt potassium sulphate—sodium sulphate) sodium carbonate, sodium sulphate, and borax.

It is a well known fact that both glaserite and borax dissolve very slowly in cold water. Also that sodium chloride dissolves very quickly in cold water. I have discovered that in this mixture of salts, for some obscure reason, sodium carbonate dissolves very slowly in cold water. In consequence, if cold water, in proper volume, be mixed with these salts in more or less finely divided condition, and for only sufficient time to dissolve all, or most of, the sodium chloride therefrom, very little of the other salts pass into solution, except the small amount of sodium sulphate contained in the solar salts, which is of little consequence so far as this process is concerned.

If the cold salt brine is then separated from the residual undissolved salts, these residual salts contain practically all of the glaserite, borax and sodium carbonate, and little or no sodium chloride, or free sodium sulphate.

These residual salts have a gross potential value, per unit of weight, nearly twice as great as it had before elimination of the sodium chloride therefrom. This permits of a much smaller plant for handling this equivalent of solar salts than would be required if the solar salts were directly refined. It also permits moving this solar salt equivalent from the point at which the material naturally occurs to any point where it is most convenient to refine the remaining salts from each other. In other words, by eliminating the low valued sodium chloride from the other salts, a great saving in freight costs is effected.

In carrying my process into practical effect I prefer to grind the solar salts to a coarse powder and then subject them to the action of cold water of approximately three times the weight of the sodium chloride contained in the solar salts. The contact between the cold water and the solar salts should be only of sufficient duration to dissolve practically all of the sodium chloride. I have found, in practice, that if the solar salts be ground to pass a 40 mesh screen, two minutes' contact is sufficient to dissolve practically all of the sodium chloride. I immediately separate the mixture by appropriate means such, for instance, as a filter press or centrifuge. The undissolved salts are then ready for either shipment to some other point for refining, or may be refined by appropriate means at the point of production.

I claim:—

1. The method of separating sodium chloride from mixed salts, comprising subjecting the mixed salts for a limited period of time to the action of cold water; and then separating the undissolved salts from the brine.

2. The method of separating sodium chloride from mixed salts, comprising subjecting the mixed salts to the action of cold water for a period of time necessary to dissolve approximately all the sodium chloride leaving the remaining salts mostly undissolved.

3. The method of separating sodium chloride from mixed salts, comprising subjecting the mixed salts to the action of cold water for a period of time necessary to dissolve approximately all the sodium chloride leaving the remaining salts mostly undissolved; and then separating the undissolved salts from the brine.

4. The method of separating sodium chloride from mixed salts containing potassium sulphate, comprising subjecting the mixed salts for a limited period of time to the action of cold water; and separating the undissolved salts from the brine.

5. The method of separating sodium chloride from mixed salts containing potassium sulphate and borax, comprising subjecting the mixed salts for a limited period of time to the action of cold water; and separating the undissolved salts from the brine.

6. The method of separating sodium chloride from a mixture of sodium chloride, potassium sulphate, sodium sulphate, sodium carbonate, and borax, comprising subjecting the mixed salts to the action of cold water for a limited period of time; and separating the undissolved salts from the brine.

7. The method of separating sodium chloride from solar salts produced from Searles Lake, California, brine, comprising subjecting the solar salts to the action of cold water for a limited period of time; and separating the undissolved salts from the brine.

In testimony whereof I have signed my name to this specification.

CLINTON E. DOLBEAR.